UNITED STATES PATENT OFFICE.

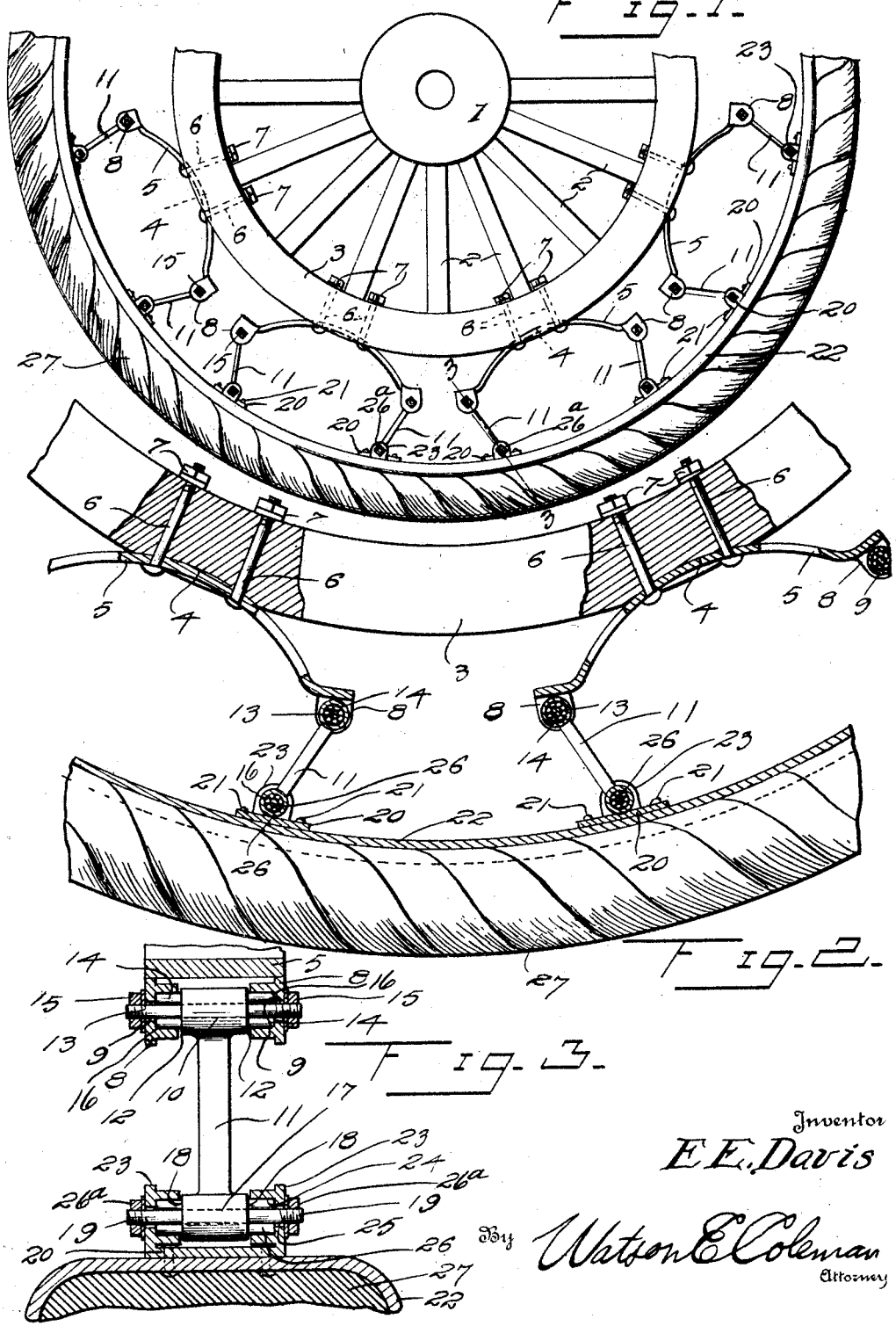

EDDIE E. DAVIS, OF VENDOR, ARKANSAS.

RESILIENT WHEEL.

1,365,384.  Specification of Letters Patent.  Patented Jan. 11, 1921.

Application filed January 21, 1920. Serial No. 353,012.

*To all whom it may concern:*

Be it known that I, EDDIE E. DAVIS, a citizen of the United States, residing at Vendor, in the county of Newton and State of Arkansas, have invented certain new and useful Improvements in Resilient Wheels, of which the following is a specification, reference being had to the accompanying drawings.

This invention relates to the art of vehicle wheels and particularly to the resilient type, wherein the resilient means for the wheel are located between the felly of the wheel and a rim which receives the tire, which may be of any suitable construction, preferably one of the solid type, and an object of the invention is to provide a wheel of this design to obviate the usual pneumatic tire.

Another object of the invention is to provide improved resilient means between the felly and rim which supports the tire, to more efficiently absorb a shock, and to relieve the strain upon the spokes of the wheel.

A further object is to provide resilient means between the felly and the rim comprising bowed springs connected to the felly in cavities thereof, to hold the springs rigid, said springs having link connections with the rim, for supporting the rim resiliently.

A still further object of the invention is to provide anti-frictional mountings for the trunnions of the links, so as to permit the rim to yield more efficiently and effectively so as to absorb the shock and relieve strain upon the spokes.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of a portion of the improved resilient wheel constructed in accordance with the invention, Fig. 2 is an enlarged detail sectional view of a portion of the felly and the rim, showing the bowed springs and more clearly illustrating the link connections and their anti-frictional mountings, and Fig. 3 is a sectional view on line 3—3 of Fig. 1, in order to show the construction of the links, and to further show the anti-frictional mountings.

Referring more especially to the drawings, 1 designates the hub of the wheel, which may be any suitable or conventional construction, and 2 the radial spokes, which are connected in any suitable manner to the felly 3. This felly on its outer edge is provided with arcuate cut away portions or bearings 4 to receive the bowed springs 5. These arcuate bearings or cut away portions are gouged out on the outer edge of the felly of the wheel, and bolts 6 pass through the bowed springs 5 and through the felly, and are provided with nuts 7, to securely hold the bowed springs in place. The opposite ends of the bowed springs 5 are provided with radially extending ears or lugs 8, which are spaced and parallel, for the reception of the trunnions 10 of the links 11. The links 11 of each bowed spring 5 are converged outwardly toward each other in the plane of the wheel thereby acting to prevent excessive rotary or turning action of the felly 3 relatively to the rim of the wheel. The trunnions 10 are provided with shoulders 12, and the cylindrical extensions beyond the shoulders are mounted in the openings 9 of said ears and also engage the anti-frictional roller bearings 14, which are mounted in the cavities of the adjacent faces of the ears or lugs 8 so as to permit of freedom of movement of the trunnions of said links. The extremities of the cylindrical extensions 13 are headed or are provided with nuts 15, so as to hold the cylindrical extensions in place while the shoulders engage the adjacent ends of said roller bearings. The cavities of the adjacent faces of the ears or lugs are designated by the numeral 16.

The other end of each link is provided with a transversely cylindrical head constituting a trunnion 17, which is also provided with shoulders 18, and the cylindrical extensions 19. From the foregoing, it will be seen that all the links are correspondingly constructed at both ends.

The extensions 13 and 19 are in the form of threaded pins, which are held in the trunnions 10 and 17 by friction. In other words, the extensions are forced through and frictionally seated in the trunnions, so that they will move with the trunnions. Also the threads of the pins or extensions are designed to be of a smaller diameter than the bodies of the pins or extensions, so that when they are driven through the trunnions, the threads will not contact with the bores of the trunnions.

If desired, the extensions or pins may be made integral with the trunnions, and in this case, to assemble the parts, the ears are bent over the ends of the pins, after which the ends of the pins or extensions may be swaged or headed or provided with nuts, as shown.

Plates 20 are secured, in any suitable manner, such as indicated at 21, to the rim 22. These plates 20 are provided with radial lugs or ears 23, which extend radially toward the hub of the wheel. These ears or lugs 23 are similar to the ears or lugs 8, namely, are provided with cavities 24 on their adjacent faces, and openings 25, concentric with the cavities. The cylindrical extensions 19 of the trunnions 17 are mounted in the openings 25 of the lugs or ears 23, so that the anti-frictional roller bearings 26 (which are in the cavities) engage said extensions in order to permit the trunnions to freely move or rock, when the central part of the wheel, which embodies the spokes 2 and the felly 3, moves incident to the weight or pressure on the hub. The extremities of the cylindrical extensions 19 of the trunnions are headed as shown at 26$^a$, so as to retain the cylindrical extensions in the openings. The rim 22 is shaped as shown in cross section, though it may be otherwise shaped, so it may receive any conventional form of tire, preferably a solid rubber tire, or a rope tire, and which tire is designated by the numeral 27. The cavities or recesses 4 of the felly 3 act to reinforce and support the bowed springs 5 rigid, so that when the arms of the bowed springs, that is the parts beyond the recesses or cavities, yield, they may quickly return to normal position, hence more efficiently absorbing the shock and relieving the strain upon the spokes. The shoulders 18 of the trunnions engage the adjacent ends of the anti-frictional roller bearings of the ears or lugs 23, so as to prevent movement of the roller bearings toward each other axially.

The invention having been set forth, what is claimed as new and useful is:—

1. In a resilient wheel, the combination with a central body part including a felly, of bowed springs connected at intervals to the felly and having spring arms extending beyond the outer face of the felly, the ends of the arms terminating in spaced ears having their adjacent faces provided with annular flanges, pivot trunnions engaging axially through the ears concentrically with the annular flanges, roller bearings engaging said trunnions and operatively mounted within the annular flanges, links having T-shaped heads connected with the trunnions and being interposed between the marginal edges of the annular flanges, thereby retaining the roller bearings in engagement with the flanges, the marginal edges of the flanges acting to retain the T-shaped heads in position, means on the ends of the trunnions for holding them in place against axial movement, a rim in surrounding concentric spaced relation to the felly and provided with operative pivotal connections with the outer ends of said links, whereby the parts may more efficiently yield when pressure is applied upon the central body of the wheel.

2. In a resilient wheel, a central body part including a felly, springs connected to the outer periphery of the felly and having arms projecting beyond the periphery of the felly, a rim in surrounding concentric spaced relation to the felly, plates secured to the inner face of the rim at intervals opposite relatively to the arms of the springs, said plates having inwardly radial spaced ears, the adjacent faces of said ears having annular flanges forming pockets, pivoting trunnions engaging concentrically through the ears and through the pockets concentrically with the annular flanges, roller bearings within the pockets and engaging about the trunnions, links pivotally and operatively engaging the central portions of the trunnions between the adjacent marginal edges of the annular flanges whereby the ends of the links are held in position, the ends of the links acting to retain the roller bearings in the pockets, and means connecting the inner ends of the links and the ends of the arms.

3. In a resilient wheel, a central body part including a felly, bowed springs connected at intervals to the felly, links operatively and pivotally connected to the ends of the bowed springs, the links of each bowed spring converging outwardly, a rim in surrounding concentric spaced relation to the felly, operative pivotal connections between the links and the rim, the adjacent links of the adjacent ends of each two springs diverging outwardly, whereby the last mentioned operative pivotal connections of the links of each bowed spring are closer together relatively than the operative pivotal connections of the links with the end of each bowed spring, thereby disposing the operative pivotal connections of the links with the rim at points within the distance between the operative pivotal connections of the links with the springs, to prevent excessive turning action of the central body part relatively to the rim.

4. In a resilient wheel, a central body part, bowed springs connected at intervals to the outer periphery of the body part and having yieldable portions, a rim in surrounding concentric spaced relation to the outer periphery of the body part, links pivotally connected to the extremities of the end portions of the springs, the links of each spring converging toward each other outwardly and the adjacent links of the adjacent ends of each two springs diverging outwardly and having pivotal connections with the rim, whereby the links of each spring coöperate to counteract excessive turning action of the body part relatively to the rim.

In testimony whereof I hereunto affix my signature.

EDDIE E. DAVIS.